US010656929B2

(12) United States Patent
Jamjoom et al.

(10) Patent No.: US 10,656,929 B2
(45) Date of Patent: May 19, 2020

(54) AUTONOMOUSLY HEALING MICROSERVICE-BASED APPLICATIONS

(71) Applicant: International Business Machines Corporation, Armonk, NY (US)

(72) Inventors: Hani T. Jamjoom, Cos Cob, CT (US); Shriram Rajagopalan, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 15/070,562

(22) Filed: Mar. 15, 2016

(65) Prior Publication Data

US 2017/0046146 A1 Feb. 16, 2017

Related U.S. Application Data

(60) Provisional application No. 62/203,544, filed on Aug. 11, 2015.

(51) Int. Cl.
| | | |
|---|---|---|
| *G06F 9/44* | (2018.01) | |
| *G06F 8/61* | (2018.01) | |
| *G06F 8/65* | (2018.01) | |
| *G06F 11/36* | (2006.01) | |
| *G06F 8/71* | (2018.01) | |

(52) U.S. Cl.
CPC .................. *G06F 8/62* (2013.01); *G06F 8/65* (2013.01); *G06F 8/71* (2013.01); *G06F 11/3612* (2013.01)

(58) Field of Classification Search
CPC ..... G06F 8/62; G06F 8/65; G06F 8/71; G06F 11/3612
See application file for complete search history.

(56) References Cited

U.S. PATENT DOCUMENTS

| 7,155,462 B1 * | 12/2006 | Singh ........................ G06F 8/65 |
| | | 717/170 |
| 8,782,632 B1 * | 7/2014 | Chigurapati .............. G06F 8/65 |
| | | 717/168 |
| 2005/0114853 A1 * | 5/2005 | Glider ........................ G06F 8/60 |
| | | 717/170 |
| 2005/0198649 A1 * | 9/2005 | Zakonov ............. G06F 11/3612 |
| | | 719/318 |
| 2006/0053139 A1 * | 3/2006 | Marzinski ........... G06F 11/1435 |

(Continued)

OTHER PUBLICATIONS

Specification of U.S. Appl. No. 62/056,425, filed Sep. 26, 2014. (Year: 2014).*

(Continued)

*Primary Examiner* — Lewis A Bullock, Jr.
*Assistant Examiner* — Tina Huynh
(74) *Attorney, Agent, or Firm* — JoAnn Crockatt; Otterstedt, Wallace & Kammer, LLP

(57) ABSTRACT

An embodiment includes a method for autonomous healing of an application comprising a plurality of microservices. The method comprises the steps of detecting a performance degradation of at least a portion of the application; and responsive to detecting the performance degradation, downgrading at least one of the plurality of microservices within the application. The downgrading comprises deploying a prior version of the at least one of the plurality of microservices; and routing at least a portion of traffic to the prior version instead of a current version of the at least one of the plurality of microservices.

19 Claims, 12 Drawing Sheets

(56) References Cited

U.S. PATENT DOCUMENTS

| | | | | |
|---|---|---|---|---|
| 2008/0091837 | A1* | 4/2008 | Langen | H04L 65/40 709/230 |
| 2009/0055809 | A1* | 2/2009 | Campbell | G06F 8/36 717/140 |
| 2010/0042869 | A1* | 2/2010 | Szabo | G06F 8/67 714/4.1 |
| 2012/0079456 | A1* | 3/2012 | Kannan | G06F 8/77 717/124 |
| 2012/0174124 | A1* | 7/2012 | Ward | G06F 8/71 719/331 |
| 2012/0317562 | A1* | 12/2012 | Wang | G06F 8/65 717/170 |
| 2014/0059530 | A1* | 2/2014 | Banavalikar | G06F 9/4406 717/170 |
| 2014/0123124 | A1* | 5/2014 | Gray | G06F 8/665 717/170 |
| 2014/0229928 | A1* | 8/2014 | Edstrom | G06F 8/65 717/171 |
| 2014/0310564 | A1* | 10/2014 | Mallige | G06F 11/0781 714/47.1 |
| 2014/0372983 | A1* | 12/2014 | Presley | G06F 11/368 717/124 |
| 2015/0317148 | A1* | 11/2015 | Ohashi | G06F 8/65 717/170 |
| 2016/0092204 | A1* | 3/2016 | Katkere | G06F 8/67 717/170 |

OTHER PUBLICATIONS

Drawings of U.S. Appl. No. 62/056,425, filed Sep. 26, 2014. (Year: 2014).*

Claims of U.S. Appl. No. 62/056,425, filed Sep. 26, 2014. (Year: 2014).*

Shriram Rajagopalan & Hani Jamjoom, "App—Bisect: Autonomous Healing for Microservice-Based Apps," HotCloud'15: 7th USENIX Workshop on Hot Topics in Cloud Computing, Jul. 2015, 7 pages, USENIX Association, https://www.usenix.org/system/files/conference/hotcloud15/hotcloud15-rajagopalan.pdf (Grace period disclosure).

Shriram Rajagopalan & Hani Jamjoom, "App—Bisect: Autonomous Healing for μService-based Apps," HotCloud'15: 7th USENIX Workshop on Hot Topics in Cloud Computing, Jul. 2015, 14 pages, USENIX Association, https://www.usenix.org/sites/default/files/conference/protected-files/hotcloud15_slides_rajagopalan.pdf (Grace period disclosure).

M. K. Aguilera et al., "Performance Debugging for Distributed Systems of Black Boxes," Proceedings of the 19th ACM Symposium on Operating Systems Principles (SOSP'03), Oct. 2003, p. 74-89, Association for Computing Machinery (ACM).

D. Athanasopoulos et al., "Service Substitution Revisited," Proceedings of the 2009 IEEE/ACM International Conference on Automated Software Engineering (ASE'09), Nov. 2009, p. 555-559, Institute of Electrical and Electronics Engineers (IEEE) Computer Society.

M. Y. Chen et al., "Pinpoint: Problem Determination in Large, Dynamic Internet Services," Proceedings of the International Conference on Dependable Systems and Networks (DSN'02), Jun. 2002, p. 595-604, Institute of Electrical and Electronics Engineers (IEEE) Computer Society.

M. Chow et al., "The Mystery Machine: End-to-End Performance Analysis of Large-Scale Internet Services," Proceedings of the 11th USENIX Symposium on Operating Systems Design and Implementation (OSDI'14), Oct. 2014, p. 217-231, USENIX Association.

R. Fonseca et al., "X-trace: A Pervasive Network Tracing Framework," Proceedings of the 4th USENIX Symposium on Networked Systems Design & Implementation (NSDI'07), Apr. 2007, p. 271-284, USENIX Association.

M. Fredj et al., "Dynamic Service Substitution in Service-Oriented Architectures," Proceedings of the 2008 IEEE Congress on Services: Part 1, Jul. 2008, p. 101-104, Institute of Electrical and Electronics Engineers (IEEE) Computer Society.

D. Ghosh et al., "Self-healing Systems: Survey and Synthesis," Decision Support Systems, Jan. 2007, v. 42, n. 4, p. 2164-2185, Elsevier B.V.

P. Hunt et al., "ZooKeeper: Wait-free Coordination for Internet-scale Systems," Proceedings of the 2010 USENIX Annual Technical Conference (ATC'10), Jun. 2010, p. 145-158, USENIX Association.

J. O. Kephart & D. M. Chess, "The Vision of Autonomic Computing," Computer, v. 36, n. 1, Jan. 2003, p. 41-50, Institute of Electrical and Electronics Engineers (IEEE) Computer Society.

M. Kim et al., "Root Cause Detection in a Service-Oriented Architecture," Proceedings of the ACM SIGMETRICS/International Conference on Measurement and Modeling of Computer Systems, Jun. 2013, p. 93-103, Association for Computing Machinery (ACM).

J. Kramer & J. Magee, "Self-Managed Systems: an Architectural Challenge," Future of Software Engineering (FOSE'07), May 2007, p. 259-268, Institute of Electrical and Electronics Engineers (IEEE) Computer Society.

N. H. Minsky, "On Conditions for Self-Healing in Distributed Software Systems," Proceedings of the Autonomic Computing Workshop, Fifth Annual International Workshop on Active Middleware Services (AMS'03), Jun. 2003, p. 86-92, Institute of Electrical and Electronics Engineers (IEEE) Computer Society.

M. T. Nygard, "5.2: Circuit Breaker," Release It! Design and Deploy Production-Ready Software, Apr. 2007, p. 115-118, The Pragmatic Programmers, LLC.

M. Salehie & L. Tahvildari, "Autonomic Computing: Emerging Trends and Open Problems," Proceedings of the First Workshop on Design and Evolution of Autonomic Application Software (DEAS), May 2005, p. 1-7, Association for Computing Machinery (ACM).

D. Schauenberg, "Development, Deployment & Collaboration at Etsy," 8th International Software Development Conference (QCon), Mar. 2014, 54 pages, https://qconlondon.com/london-2014/dl/qcon-london-2014/slides/DanielSchauenberg_DevelopmentDeploymentCollaborationAtEtsy.pdf.

B. H. Sigelman et al., "Dapper, a Large-Scale Distributed Systems Tracing Infrastructure," Google Technical Report, Apr. 2010, 14 pages, http://research.google.com/archive/papers/dapper-2010-1.pdf.

W. Trumler et al., "Adaptive Self-optimization in Distributed Dynamic Environments," Proceedings of the First International Conference on Self-Adaptive and Self-Organizing Systems (SASO'07), Jul. 2007, p. 320-323, Institute of Electrical and Electronics Engineers (IEEE) Computer Society.

A. Whitaker et al., "Configuration Debugging as Search: Finding the Needle in the Haystack," Proceedings of the 6th Symposium on Operating Systems Design and Implementation (OSDI'04), Dec. 2004, p. 77-90, USENIX Association.

X. Zhao, "Iprof: A Non-intrusive Request Flow Profiler for Distributed Systems," Proceedings of the 11th USENIX Symposium on Operating Systems Design and Implementation (OSDI'14), Oct. 2014, p. 629-644, USENIX Association.

Z. Dehghani, "Real-World Microservices: Lessons from the Frontline," YOW! Nights Australian Software Developer Conference, Sep. 2014, 70 pages, https://www.thoughtworks.com/insights/blog/microservices-lessons-frontline.

J. Hamilton, "AWS Innovation at Scale," AWS re:Invent Conference, Nov. 2014, 25 pages, Amazon Web Services (AWS), http://www.slideshare.net/AmazonWebServices/spot301-aws-innovation-at-scale-aws-reinvent-2014.

A. Vahdat, "Enter the Andromeda Zone—Google Cloud Platform's Latest Networking Stack," Google Cloud Platform Blog, Apr. 2014, 4 pages, http://googlecloudplatform.blogspot.com/2014/04/enter-andromeda-zone-google-cloud-platforms-latest-networking-stack.html.

International Business Machines (IBM), "Managing and Monitoring Network Resources," Cloud OpenStack Services Documentation, 2015, 20 pages, http://open.ibmcloud.com/documentation/managing-and-monitoring-network-resources.html.

Rackspace, "Secure Networks in the Cloud," 3 pages, downloaded from http://www.rackspace.com/cloud/networks, Feb. 7, 2016.

(56) References Cited

OTHER PUBLICATIONS

C. Watson et al., "A Microscope on Microservices," The Netflix Tech Blog, Feb. 2015, 10 pages, http://techblog.netflix.com/2015/02/a-microscope-on-microservices.html.
Appdynamics, "Application Performance Management & Monitoring," 13 pages, downloaded from https://www.appdynamics.com Feb. 7, 2016.
New Relic, "Application Performance Management & Monitoring," 9 pages, downloaded from http://newrelic.com Feb. 7, 2016.
Cloud Foundry, "The Industry Standard for Cloud Applications," 8 pages, downloaded from https://www.cloudfoundry.org Feb. 7, 2016.
International Business Machines (IBM), "Bluemix—Create, Deploy, Manage Your Applications in the Cloud," 6 pages, downloaded from http://www.ibm.com/cloud-computing/bluemix, Feb. 7, 2016.
Pivotal, "Pivotal Cloud Foundry," 9 pages, downlaoded from http://pivotal.io/platform Feb. 7, 2016.
Netflix, "Open Source Software Center," 6 pages, downloaded from http://netflix.github.io Feb. 7, 2016.
Github, "Netflix/Hystrix," 5 pages, downloaded Feb. 7, 2016 from https://github.com/netflix/hystrix.
Wikipedia, "DevOps," downloaded Aug. 11, 2015, dated Jul. 9, 2015, 4 pages, https://en.wikipedia.org/wiki/DevOps.
Sanjeev Sharma, "DevOps for Dummies: IBM Limited Edition," 2014, p. 1-38, John Wiley & Sons.
Peter Mell et al. The NIST Definition of Cloud Computing. NIST Special Publication 800-145. Sep. 2011. pp. 1-7.

\* cited by examiner

FIG. 6A

App Manifest file 600

```
{
"name": "A",
"version": "5.0",
...
"dependencies": {
    "B": ">= 3.0",
    "D": ">= 1.0
          && <= 2.0"
}
...
}
```

601 — name/version
602 — dependencies
603 — "D": ">= 1.0 && <= 2.0"

AUTONOMOUSLY HEALING MICROSERVICE-BASED APPLICATIONS

CROSS-REFERENCE TO RELATED APPLICATIONS

This patent application claims the benefit of U.S. Provisional Patent Application Ser. No. 62/203,544 filed Aug. 11, 2015, the complete disclosure of which is expressly incorporated herein by reference in its entirety for all purposes.

STATEMENT REGARDING PRIOR DISCLOSURES BY THE INVENTORS

The named inventors of the present application presented a paper entitled "App-Bisect: Autonomous Healing for Microservice-Based Apps," and accompanying slides on Jul. 7, 2015 at HotCloud'15: 7th USENIX Workshop on Hot Topics in Cloud Computing. Neither the paper nor the slides were published prior to Jun. 4, 2015. The entire paper and at least a portion of the accompanying slides were included as Appendices to the aforementioned Provisional Patent Application. Copies of the published paper and slides are submitted herewith, cited in the accompanying Information Disclosure Statement, and expressly incorporated herein by reference in their entirety for all purposes.

FIELD OF THE INVENTION

The present invention relates to the electrical, electronic and computer arts, and, more particularly, to computing services such as cloud computing services and the like.

BACKGROUND OF THE INVENTION

The microservice and DevOps approach to software design has resulted in new software features being delivered immediately to users, instead of waiting for long refresh cycles. It should be noted that while these approaches are primarily discussed herein with respect to cloud applications, both microservices and DevOps are more generally applicable to development of a wide variety of software applications. Under the conventional "waterfall" development methodology, improvements (e.g., new features, performance improvements, bug fixes, etc.) are periodically delivered as one big update. For each update, the cycle of Plan, Develop, Test, and Deploy can take months to years.

However, developers and system administrators are adopting new software practices which stress communication, collaboration, integration, automation, and measurement of cooperation between software developers and other information-technology (IT) professionals. Such practices have collectively come to be termed as DevOps, which is a clipped compound of "development" and "operations."

Application developers and operations personnel employ agile software practices such as DevOps to reduce the time to market new features and improvements to the application. DevOps includes continuous integration and deployment of new features and incremental updates. The frequency of such deployments varies anywhere from a few times a week to fifty times a day. Therefore, in DevOps, the aforementioned cycle of Plan, Develop, Test, and Deploy only spans hours to days.

User feedback is constantly monitored and incorporated. Developers and operations personnel work closely to quickly test and deploy new features, monitor user experience, and finally incorporate changes based on monitoring into the next iteration. The tight feedback loop created by this process enables software to evolve faster in response to user needs.

In order to continuously incorporate user feedback, application owners now choose to release early and release often, foregoing rigorous testing in exchange for hastening the time to market a product features. Thus, this rapidly evolving application deployment can increase the occurrence of software bugs and performance regressions, which therefore become an important cause of downtime.

There are many performance profiling tools to help developers identify software issues causing degradation in throughput and response times to the end user. However, they provide only monitoring capabilities. There are also design patterns like circuit breakers that enable distributed applications to prevent transient and component-level errors from cascading.

Persistent failures, those stemming from software bugs and under-tested features, continue to require human intervention. Application availability is impacted because debugging modern cloud-based distributed applications is often a time consuming task. While the common web application has now become a distributed resilient application, the complexity of troubleshooting issues has also spread from a single machine to a deployment spanning data centers. The mean time to recover (MTTR) an application from a performance bug depends on how quickly the human operator responds to the issue. If the software issue arises at an hour when the developer/administrator is not available (e.g., midnight), the time to repair (and hence recover) the application is high, resulting in loss of traffic and revenue.

SUMMARY OF THE INVENTION

An embodiment includes a method for autonomous healing of an application comprising a plurality of microservices. The method comprises the steps of detecting a performance degradation of at least a portion of the application; and responsive to detecting the performance degradation, downgrading at least one of the plurality of microservices within the application. The downgrading comprises deploying a prior version of the at least one of the plurality of microservices; and routing at least a portion of traffic to the prior version instead of a current version of the at least one of the plurality of microservices.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments rapidly react to and correct performance issues that arise in microservice applications. One or more embodiments may provide an autonomous service operating at the cloud infrastructure layer, which can identify and heal microservice-based applications deployed in the cloud. One or more embodiments of the present invention may advantageously provide a platform, such as a PaaS platform, for microservices that provides automatic and safe downgrade to applications in case of performance regressions.

These and other features and advantages of the present invention will become apparent from the following detailed description of illustrative embodiments thereof, which is to be read in connection with the accompanying drawings.

BRIEF DESCRIPTION OF THE DRAWINGS

FIG. 6A depicts an exemplary application manifest file according to an embodiment of the present invention.

DETAILED DESCRIPTION OF PREFERRED EMBODIMENTS

Figure 1:
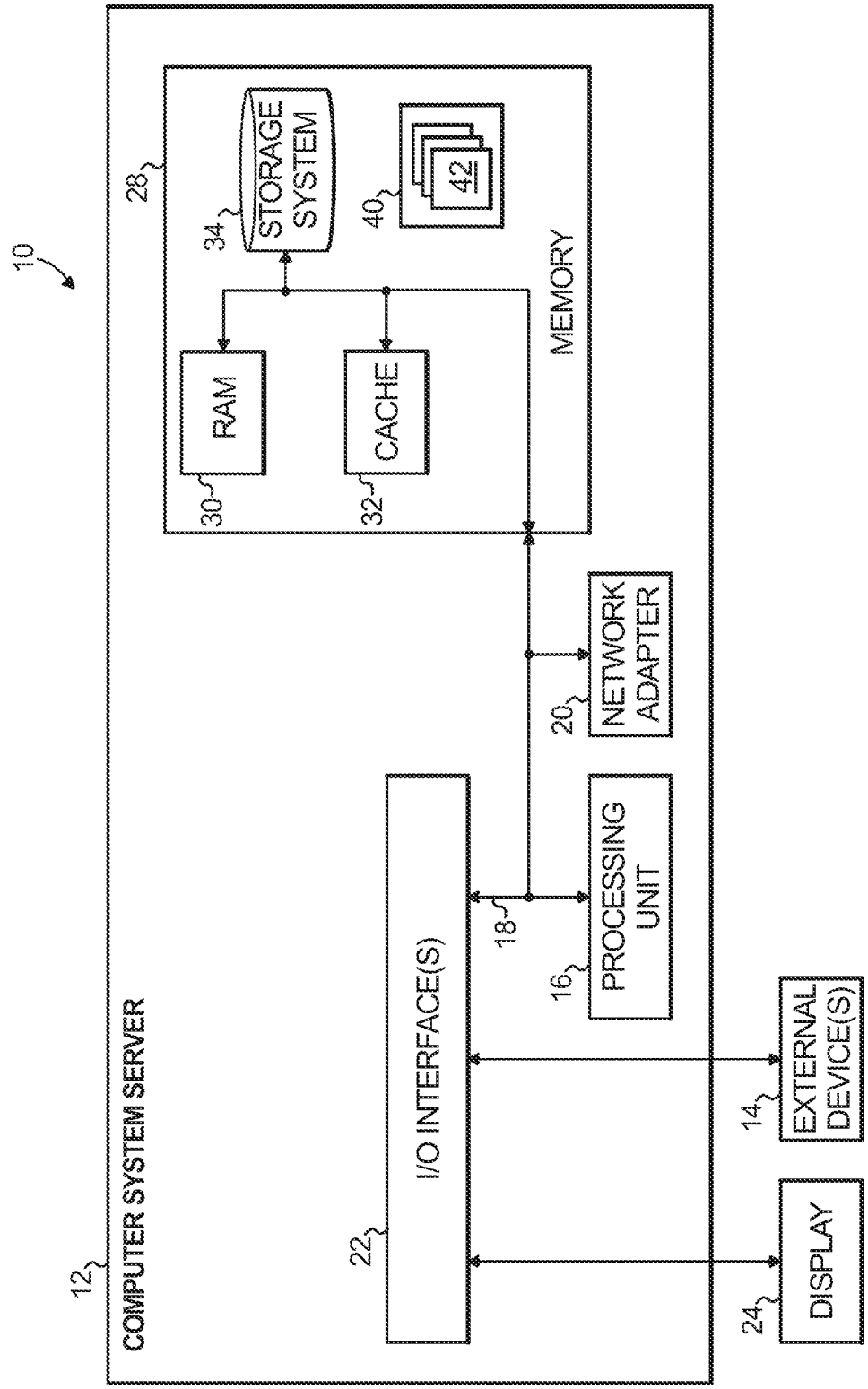
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
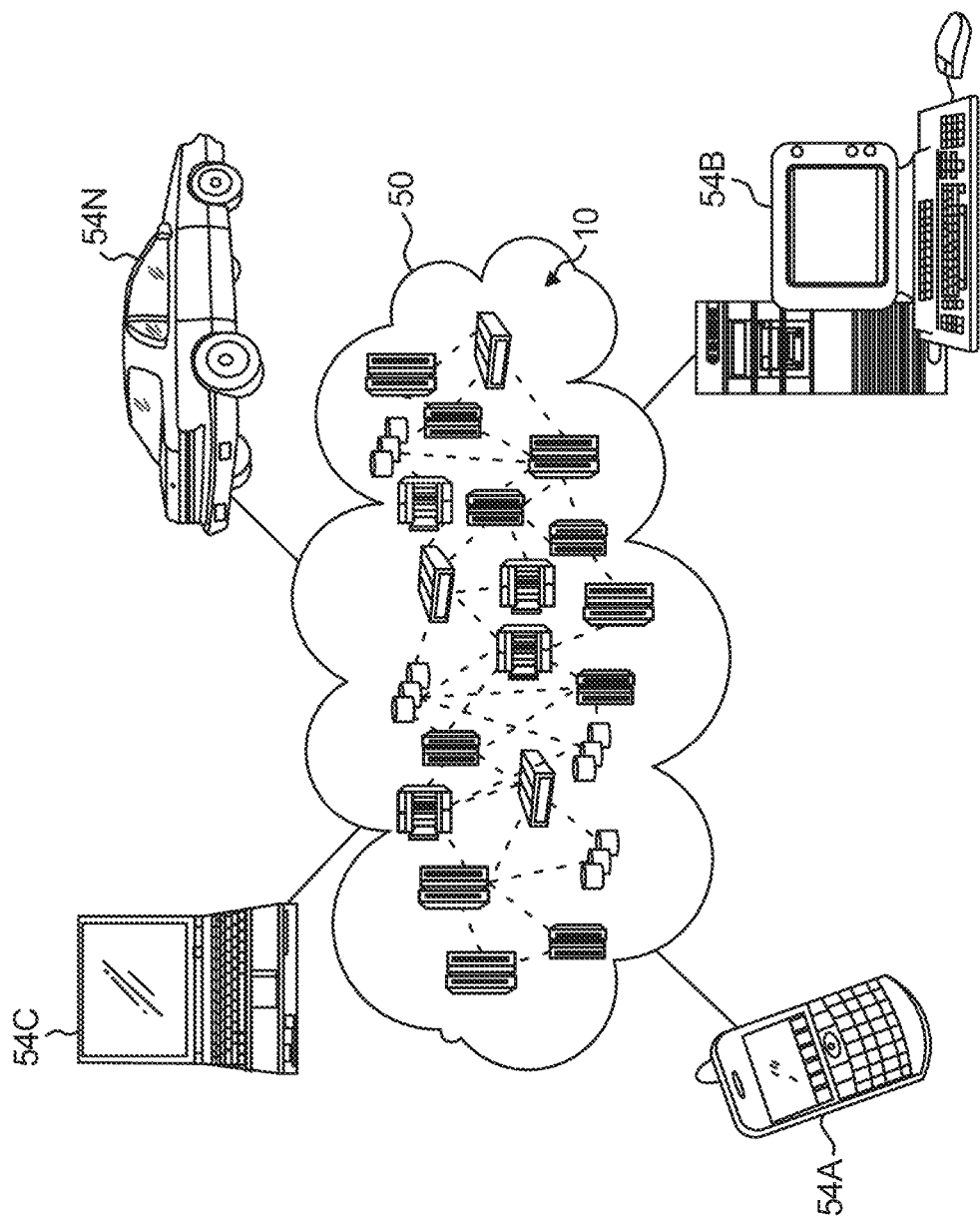
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
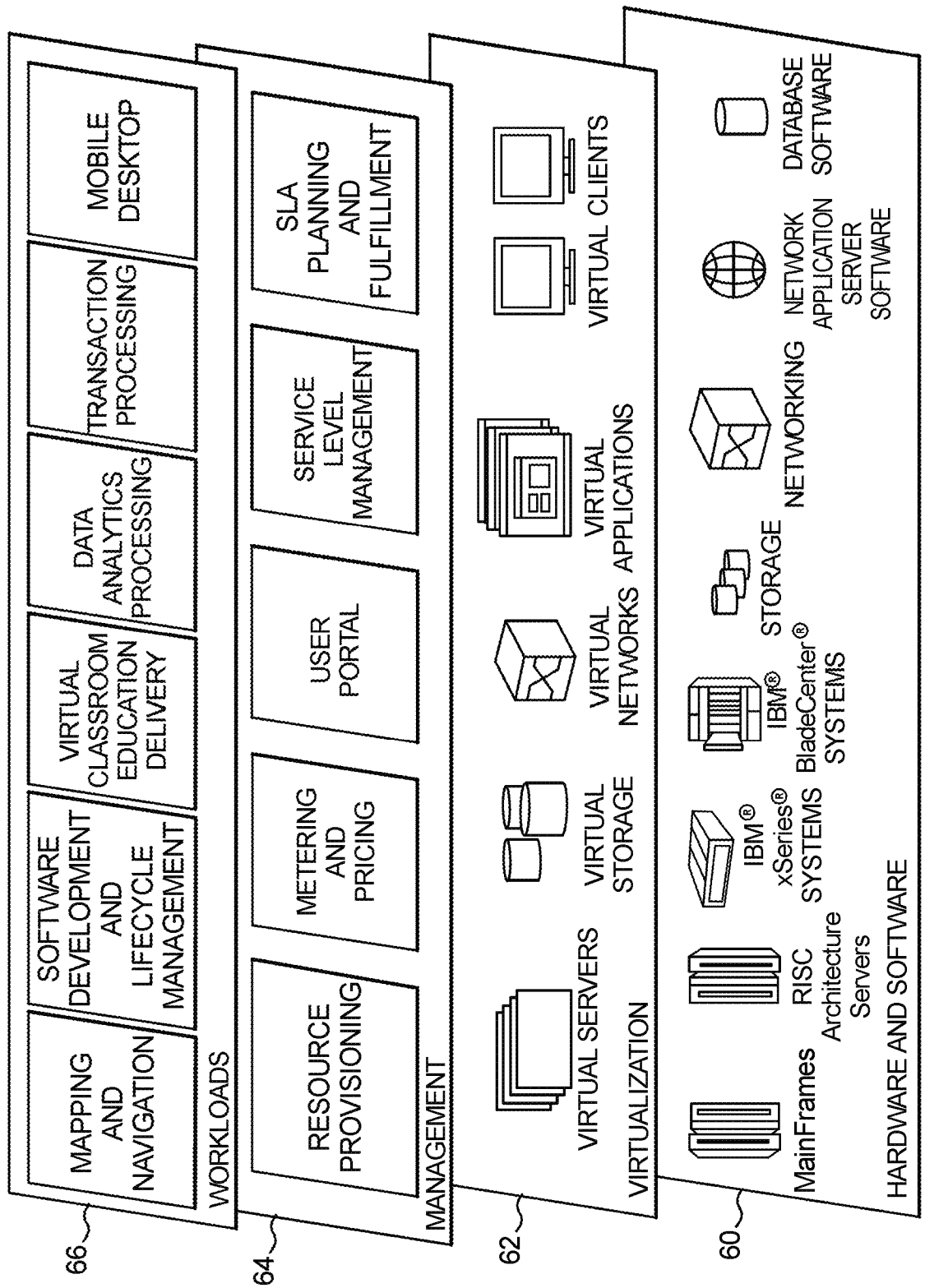
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Figure 4A:
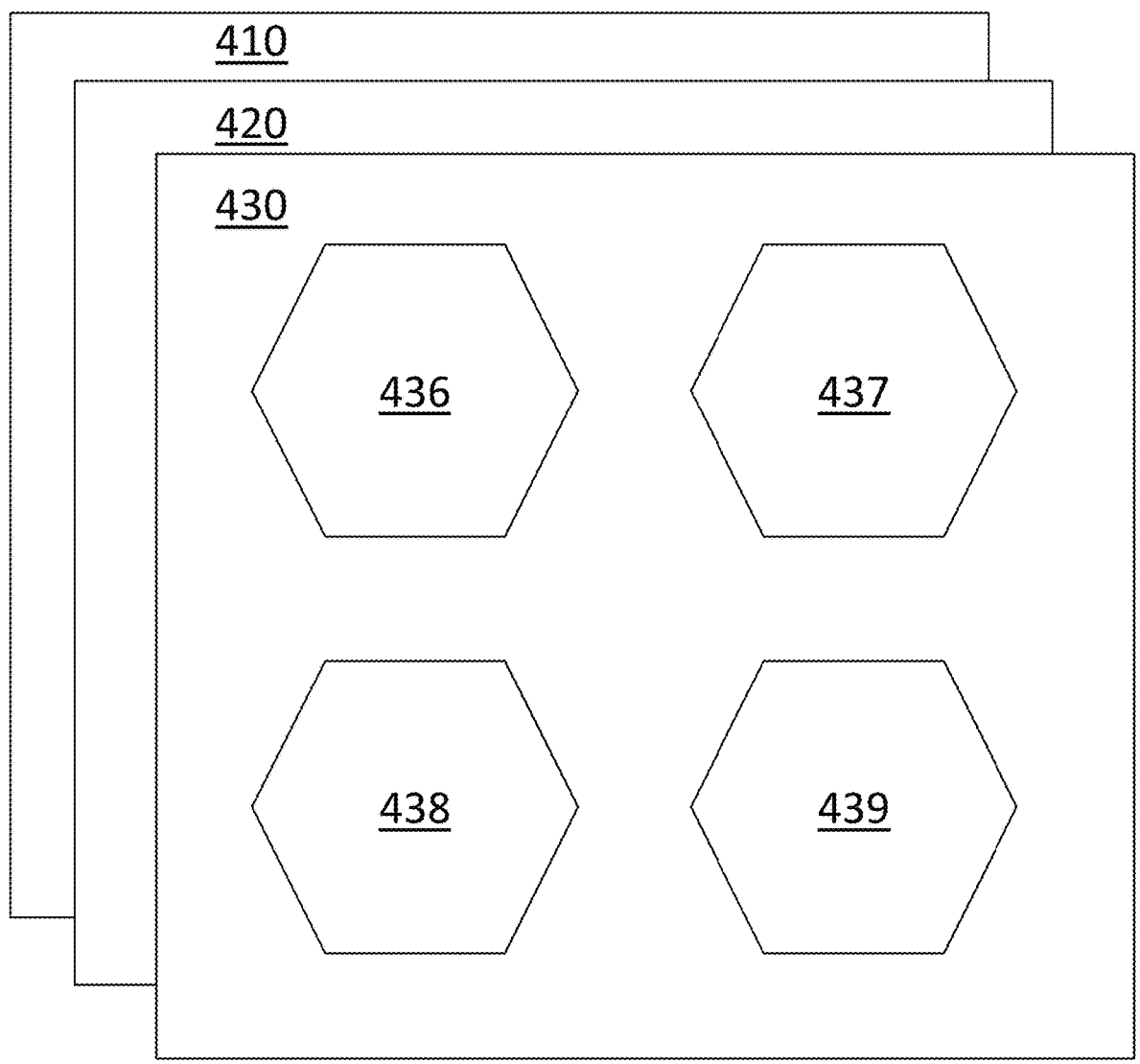
FIG. 4A depicts an exemplary monolithic service architecture.
Figure 4B:
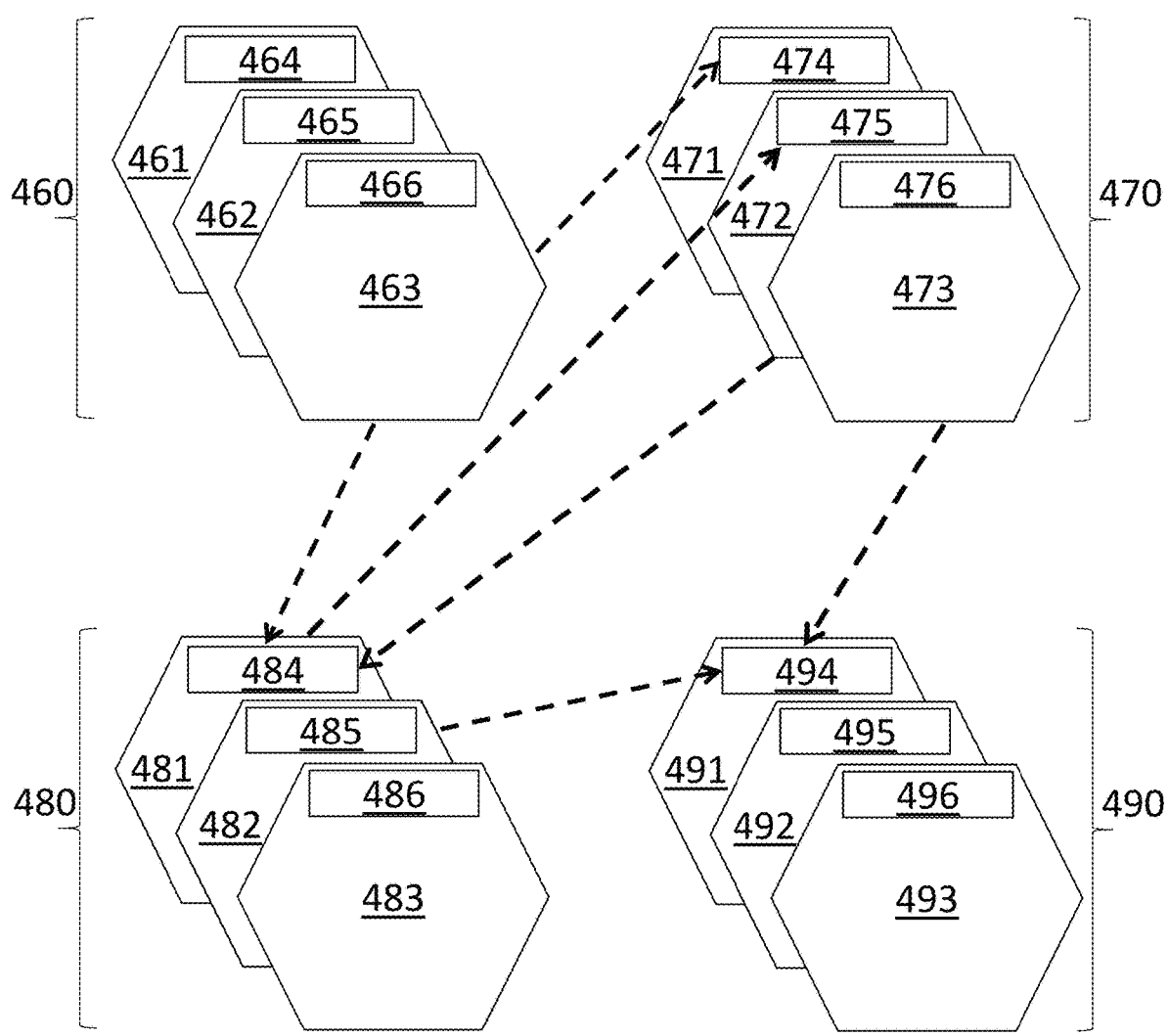
FIG. 4B depicts an exemplary microservice-based architecture suitable for use with an embodiment of the present invention.

A current trend in software application development is a shift from monolithic services to microservices. FIG. 4A depicts an exemplary monolithic service architecture, while FIG. 4B depicts an exemplary microservice-based architecture suitable for use with embodiments of the present invention. In FIG. 4A, monolithic service 400 is comprised of a plurality of service instances 410, 420 and 430. Each of these service instances includes several distinct functionalities, such as 436, 437, 438 and 439 within service instance 430 in FIG. 4A.

By contrast, in the microservice approach, applications are structured as a loosely-coupled (e.g., fine-grained) collection of small, well-defined stateless services (referred to as microservices) that communicate with each other only through well-defined application programming interfaces (APIs). FIG. 4B depicts an exemplary microservice-based architecture. In FIG. 4B, each functionality is in its own dedicated service. Thus, microservice 460 in FIG. 4B, which comprises microservice instances 461, 462 and 463, corresponds to functionality 436 in service instance 430 in FIG. 4A, as well as the corresponding functionalities in service instances 410 and 420 in FIG. 4A. Microservice 470 in FIG. 4B, which comprises microservice instances 471, 472 and 473, corresponds to functionality 437 in service instance 430 in FIG. 4A, as well as the corresponding functionalities in service instances 410 and 420 in FIG. 4A. Microservice 480 in FIG. 4B, which comprises microservice instances 481, 482 and 483, corresponds to functionality 438 in service instance 430 in FIG. 4A, as well as the corresponding functionalities in service instances 410 and 420 in FIG. 4A. Microservice 490 in FIG. 4B, which comprises microservice instances 491, 492 and 493, corresponds to functionality 439 in service instance 430 in FIG. 4A, as well as the corresponding functionalities in service instances 410 and 420 in FIG. 4A.

Moreover, as discussed above, each microservice instance includes a well-defined API. Within microservice 460, instances 461, 462 and 463 include respective APIs 464, 465 and 466. Within microservice 470, instances 471, 472 and 473 include respective APIs 474, 475 and 477. Within microservice 480, instances 481, 482 and 483 include respective APIs 484, 485 and 488. Within microservice 490, instances 491, 492 and 493 include respective APIs 494, 495 and 499.

As also discussed above, microservices communicate with each other only through their APIs. Thus, in FIG. 4B, instance 463 within microservice 460 is communicating with API 474 of instance 471 within microservice 470; instance 463 within microservice 460 is also communicating with API 484 of instance 481 within microservice 470. Instance 481 within microservice 480 is communicating with API 475 of instance 472 within microservice 470, and instance 472 within microservice 470 is also communicating with API 484 of instance 481 within microservice 470. Both instance 482 within microservice 480 and instance 473 within microservice 470 are communicating with API 494 of instance 491 within microservice 490.

The microservice design paradigm simplifies the design of scalable and robust cloud applications. For example, many web applications hosted in Platform as a Service clouds are being re-architected to be microservice-oriented. In the context of cloud applications, microservices are typically deployed inside containers (e.g., Docker® which is a registered trademark of Docker, Inc.) in container cloud environments (e.g., Bluemix® which is a registered service mark of International Business Machines Corp.)

Thus, an application may comprise two or more loosely-coupled and/or fine-grained microservices, with well-defined web service API(s), working together to generate responses to end user requests. Indeed, applications may be composed of hundreds of instances of heterogeneous microservices, backed by scalable data stores. Individual microservices can be owned and operated by independent developers and/or teams. Each microservice can be developed and deployed independently of other microservices, by independent teams of software developers who interact with other services only through their exposed web services APIs. From a code development and operations perspective, each microservice has its own branch with updates to the service being committed to that branch. Services are updated frequently, independent of other services, while maintaining compatibility.

Figure 5A:
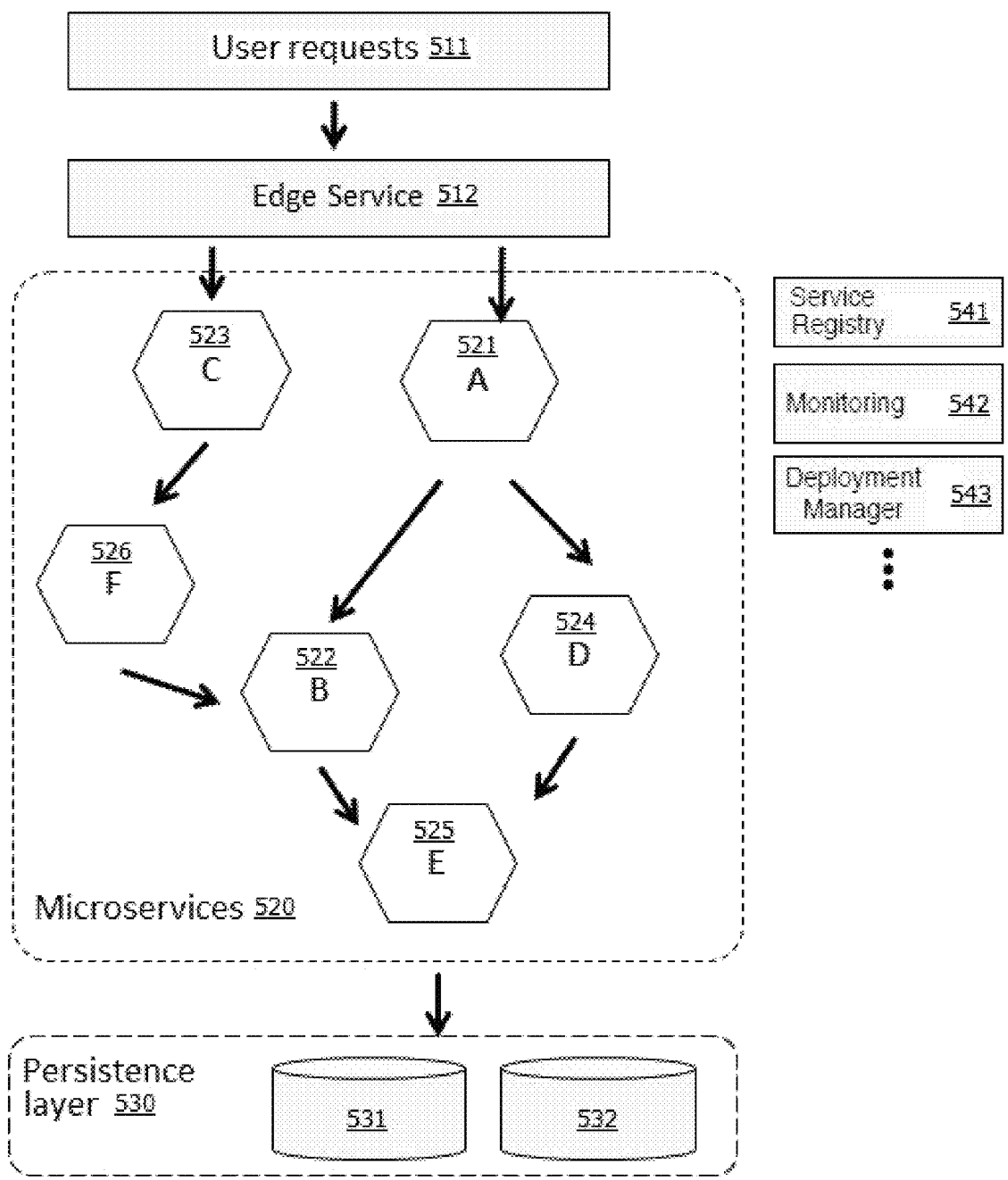
FIG. 5A depicts an exemplary microservice-based application suitable for use with an embodiment of the present invention.
Figure 5B:
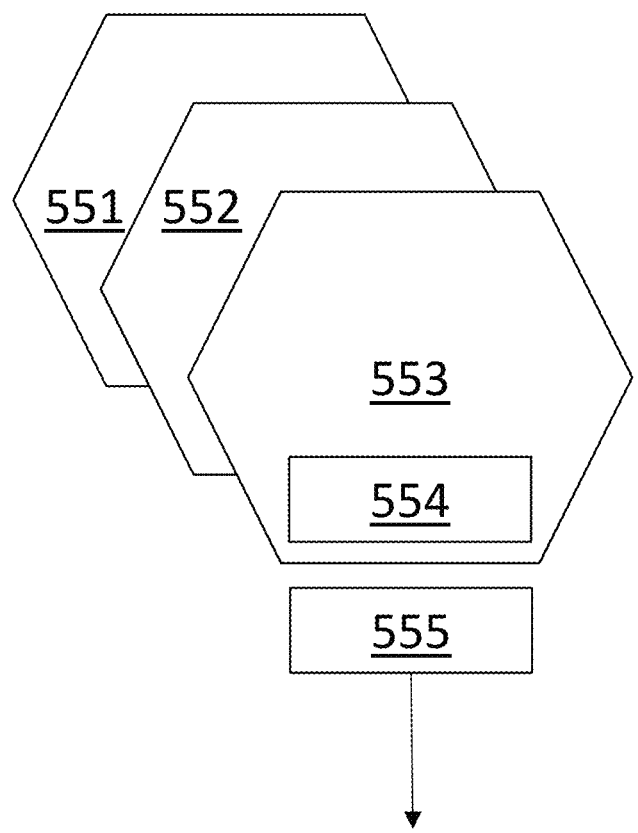
FIG. 5B depicts an exemplary microservice suitable for use with the application shown in FIG. 5A.

FIG. 5A depicts an exemplary microservice-based application deployment suitable for use with an embodiment of the present invention, and FIG. 5B depicts an exemplary microservice suitable for use with the application shown in FIG. 5A. As shown in FIG. 5A, user requests 511 are received by edge service 512, then processed by microservices 520, then output to scalable data stores 531 and 532 within persistence layer 530.

More particularly, edge service 512 distributes these requests to microservices C 523 and A 521. Microservice C 523 directs its output to microservice F 526, which in turn directs its output to microservice B 522. Microservice A 521 distributes its output between microservice B 522 and microservice D 524, both of which direct their output to microservice E 525. Microservice E 525 directs its output to persistence layer 530 (e.g., scalable data stores 531 and 532).

Each of the microservices 521, 522, 523, 524, 525 and/or 526 shown in FIG. 5A may have the structure shown in FIG. 5B. As shown in FIG. 5B, microservice 550 includes microservice instances 551, 552 and 553. Microservice 550 also includes a circuit breaker 554 which, as discussed above, is a design pattern that enables distributed applications to prevent transient and component-level errors from cascading. Microservice 550 also has associated therewith a client-side load balancer 555, which is further discussed below.

The application shown in FIG. 5A also includes service registry 541. In one embodiment, service registry 541 may be implemented using the Zookeeper registry service described in P. Hunt et al., "ZooKeeper: Wait-free Coordination for Internet-scale Systems," Proceedings of the 2010 USENIX Annual Technical Conference (ATC'10), June 2010, p. 145-158, the disclosure of which is incorporated by reference herein. Microservices 520 register themselves with service registry 541, which may be used for service discovery as well. This service discovery node enables services to discover the locations of other services. For scalability purposes, clients (services) periodically fetch the locations of other services in the system. When invoking other services, load balancing is typically performed at the client-side (e.g., by 555 in FIG. 5B) instead of querying the centralized registry (e.g., 541 in FIG. 5A) for every invocation.

The application shown in FIG. 5A also includes components to facilitate performance management. Performance management requires monitoring, analyzing and maintaining the performance of an application. In user facing applications, an end user's experience is the key indicator of application performance, and relevant metrics may include end-to-end response time and application throughput. Thus, performance monitor 541 measures service health using various metrics and/or measures end user experience using various site metrics. Additionally and/or alternatively, performance monitor 541 may use one or more metrics (e.g., prolonged periods of poor response time, high error rates in API calls, frequent crashes, etc.) to measure user experience with the application and/or the operation of individual microservices within the application.

Data from monitoring subsystem 541 is continuously fed into a real-time analytics subsystem, which may be within elements 541 and/or 542. The analytics subsystem generates alerts whenever it observes performance issues. A maintenance subsystem within deployment manager 542 acts on the alerts, typically by launching new instances (i.e., auto scaling) or alerting the human operator.

As discussed above, DevOps can result more frequent software bugs and performance degradation due to insufficient testing. Microservice-based architectures can result in a high MTTR: triaging is time consuming as the knowledge base is spread across developer teams.

Embodiments of the present invention provide an autonomous tool (e.g., an autonomous system service) to react to (e.g., troubleshoot and repair) performance issues in microservice-based applications deployed in production environments, such as the cloud. For example, embodiments may include a system-level application-agnostic tool intended to operate in unsupervised mode. Additionally and/or alternatively, embodiments may include a cloud platform service to deploy interim fixes for a microservice-based application.

Instead of forcing applications to function poorly while waiting for a software update, systems and methods according to embodiments of the invention can advantageously minimize the MTTR by routing traffic through a previous version of the application where the issue is not present. More particularly, embodiments of the invention may downgrade one or more microservices within the application to an older version that does not exhibit performance regressions. This downgrade may be autonomic for immediate response to availability related events.

Where a microservice-based application is represented as a graph of microservices that evolve over time, in which any update to a microservice constitutes a mutation of the graph, embodiments of the present invention deploy a particular version of the graph from the past as an interim measure until the problem is permanently fixed.

An embodiment of the present invention evaluates all possible compatible older versions of service combinations in production alongside the current deployment, then stops the search upon finding the most recent combination of versions with sufficient performance (e.g., that offer the desired end user experience). Thus, an embodiment of the present invention may systematically test various past-versions of the application's microservices by co-deploying them along with their present-version counterparts and diverting respective portions of user traffic to the various versions. Upon finding a combination of microservices (including past-versions and/or present-versions) where the performance issue is not present is found, all other versions are decommissioned, effectively rolling back parts of the application to the past. All user traffic is diverted to the selected combination until a human operator intervenes.

Service oriented architectures (SOA) in the past have attempted to use autonomic service substitution in case of a service failure. See, e.g., M. Fredj et al., "Dynamic Service Substitution in Service-Oriented Architectures," Proceedings of the 2008 IEEE Congress on Services: Part 1, July 2008, p. 101-104, and D. Athanasopoulos et al., "Service Substitution Revisited," Proceedings of the 2009 IEEE/ACM International Conference on Automated Software Engineering (ASE'09), November 2009, p. 555-559, the disclosures of which are both incorporated by reference herein. However, these approaches resort to looking for substitutes providing the same service from the current pool of executing services. In a microservices environment, functionality is rarely duplicated. At the same time, compared to an SOA application, the microservice-based application is highly dynamic, with new services, features and fixes being constantly deployed. Autonomous healing in this scenario faces a different set of challenges compared to prior work in SOA systems.

Chronus is described in A. Whitaker et al., "Configuration Debugging As Search: Finding the Needle in the Haystack," Proceedings of the 6th Symposium on Operating Systems Design and Implementation (OSDI'04), December 2004, p. 77-90, the disclosure of which is incorporated by reference herein. Chronus helps debug failures caused by configuration errors in single-machine applications, by performing a binary search over previously recorded states of the application, to locate the point in time when the configuration error was made. One or more embodiments target distributed applications, searching through the service dependency graph with the primary focus of providing business continuity by bring the application or its older version back online, as opposed to finding the root cause for debugging.

Embodiments of the present invention may include an autonomous system tasked with maintaining application performance. Embodiments accordingly need to determine when to repair the application. Embodiments of the present invention may adopt a high-availability approach by treating a performance degradation as application downtime. More particularly, embodiments of the present invention may treat an application experiencing prolonged periods (e.g., on the order of tens of minutes) of performance loss (e.g., poor response time) as a failure. However, one or more embodiments of the present invention may ignore transient issues such as temporary drops in performance while one or more services are scaling-out, spurious timeouts, hard to reproduce nondeterministic bugs, etc. One or more embodiments may also repair an application where there is a high frequency of errors when invoking a microservice's API, frequent crashes of a microservice, or other recurring error events in log files.

One or more embodiments may differentiate between infrastructure failures and application level failures. For example, one or more embodiments have knowledge of and/or visibility over both the application deployment and the underlying infrastructure. Thus, one or more embodiments may operate at the system-level and/or as a cloud service. Additionally and/or optionally, one or more embodiments provide an autonomous service operating at the cloud infrastructure layer, which can identify and heal microservice-based applications deployed in the cloud.

One or more embodiments may repair applications only when the performance issue can be attributed to the application and not the underlying infrastructure. Thus, one or more embodiments may ignore scenarios where the performance issue is caused by failures in the underlying infrastructure such as hardware failures, network partitions, transient link congestion, etc. For example, if there is a long outage in a certain section of the data center, application performance issues in the affected portion of the data center are ignored until the system issues are resolved.

As discussed above with reference to FIG. 5A, the application's response to the user is a composition of outputs from various microservices constituting the application. While the application certainly depends on all its microservices, individual microservices may also depend on each other for their functions. For example, as discussed above with reference to FIG. 5A, microservice A 521 distributes its output between microservice B 522 and microservice D 524. Thus, microservice A 521 depends on microservice B 522 and microservice D 524.

Given that the microservices can be developed and updated independently, when updates are made to a microservice's data model or API, developers maintain backward compatibility by continuing to support the previous version until all dependent microservices are updated. During build or deployment time, every microservice specifies its dependencies on the minimum required version of other microservices in the application in manifest files.

FIG. 6A shows an exemplary manifest file 600 which may be associated with, for example, microservice A 521 in FIG. 5A. As discussed above, microservice A 521 depends on microservice B 522 and microservice D 524. Section 601 of manifest file 600 shows that the manifest file is associated with a microservice having the name "A" and the version "5.0." With every new update to a microservice, the version number in section 601 of its manifest file is updated. Section 602 indicates that version 5.0 of microservice A 521 depends on microservice B 522 and requires that microservice B 522 have a version greater than or equal to 3.0. Section 603 indicates that version 5.0 of microservice A 521 depends on microservice D 524 and requires that microservice B 524 have a version greater than or equal to 1.0 and less than or equal to 2.0.

Figure 6B:
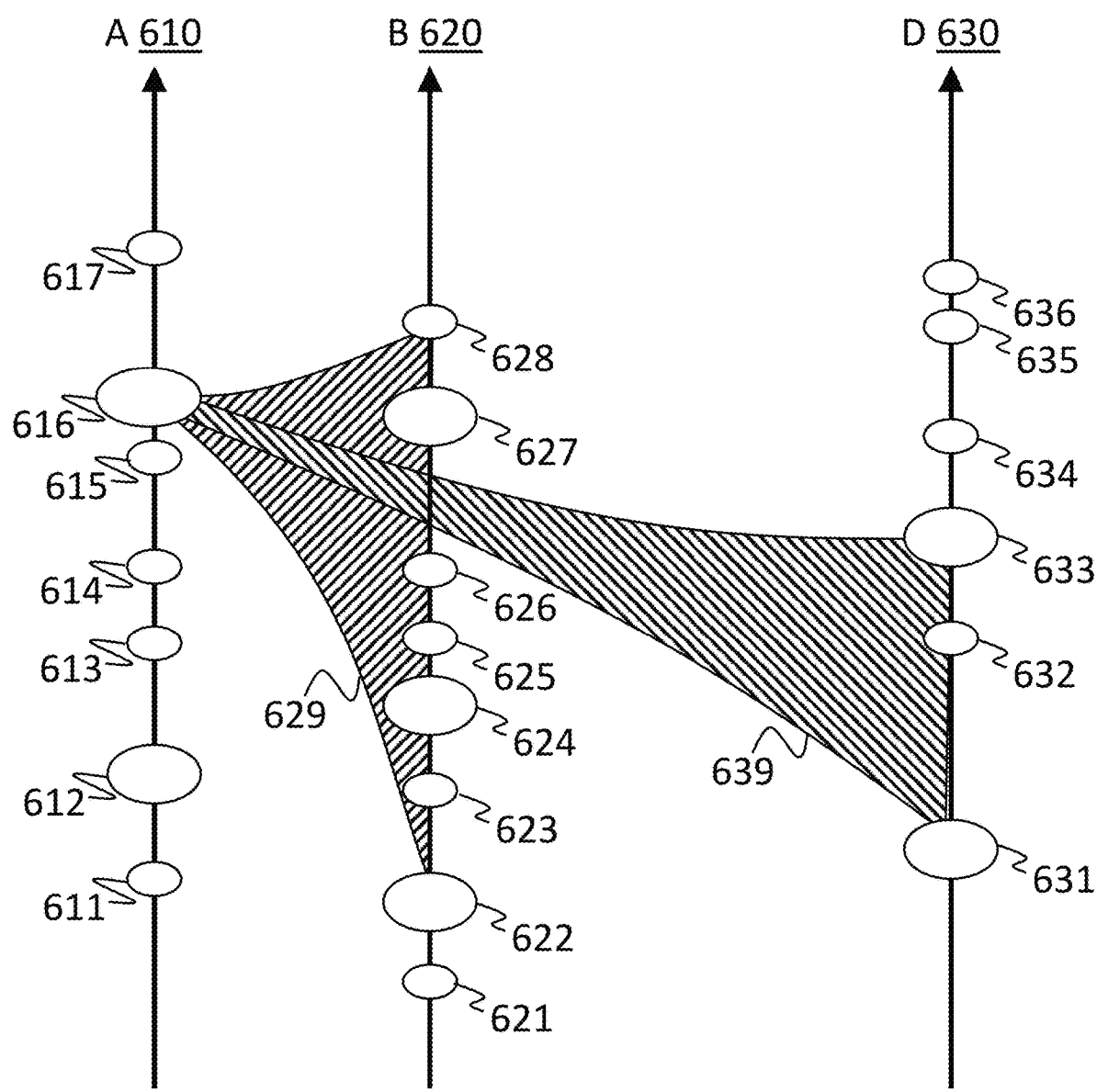
FIG. 6B depicts exemplary dependency ranges corresponding to the application manifest file shown in FIG. 6A.

FIG. 6B shows revision histories for the microservices described in FIG. 6A. Revision history 610 is for microservice A 521, revision history 620 is for microservice B 522, and revision history 630 is for microservice D 630. The top of each revision history represents the latest versions, with older versions being shown lower on the revision history. On each revision history, the larger shapes represent major updates, while the smaller shapes represent minor updates.

On revision history 630 for microservice D 524, shape 631 represents version 1.0, shape 632 represents version 1.1, shape 633 represents version 2.0, shape 634 represents version 2.1, shape 635 represents version 2.2, and version 636 represents version 2.3. Shape 622 on revision history 620 represents version 3.0 of microservice B 622, and shape 616 on revision history 610 represents version 5.0 of microservice A 521.

The shaded portion 629 represents the dependency range specified in section 602 of manifest file 600: namely, that microservice A 521 version 10.0 (shape 616 on revision history 610) requires that microservice B 522 have a version greater than or equal to 3.0 (shape 622 on revision history 620). Note that all versions of microservice B 522 greater than 3.0 (e.g., all shapes above 622 on revision history 620) are included within dependency range 629, as is version 3.0 (shape 622) itself.

The shaded portion 639 represents the dependency range specified in section 604 of manifest file 600: namely, that microservice A 521 version 10.0 (shape 616 on revision history 610) requires that microservice D 524 have a version greater than or equal to 1.0 (shape 631 on revision history 630) but less than or equal to 2.0 (shape 633 on revision history 630). Note that all versions of microservice D 524 between 1.0 and 2.0 (e.g., all shapes between 631 and 633 on revision history 630) are included within dependency range 629, as are version 1.0 (shape 631) and version 2.0 (shape 633) themselves.

The dependencies provided in manifest files, such as those discussed above with reference to FIGS. 6A and 6B, are already enforced in several Platform as a Service (PaaS) clouds. With every new update to a microservice, its version number in the manifest file is updated. The PaaS platform deploys the instances of respective versions of microservices accordingly. At runtime, microservices advertise their versions and discover the presence of appropriate dependents using systems like Zookeeper that enable service registration and discovery.

When deploying an older version of one microservice, older versions of other dependent services may need to be deployed as well. An illustrative embodiment of the present invention may take a package management approach in which it records the microservice dependencies and the application topology at every update to a microservice. When a previous version of one microservice is deployed, the embodiment also deploys appropriate versions of other dependent microservices with the latest version possible. The dependency on a range of versions enables the embodiment to start with the latest possible version that may include additional bug fixes compared to the earliest possible version. When reverting a service to its earlier incarnation, the embodiment can also revert dependent services to their most recent and compatible version, thus enduring that a deployed combination of services is compatible.

In application development, canary testing is a process where a new version of a microservice is deployed alongside the older version. A portion of the user traffic is diverted to the newer version. Various metrics such as response time, user behavior, and the like are monitored to determine whether the new/updated microservice achieved its goals (be it performance improvements or new features).

An illustrative embodiment of the present invention takes an inverted canary testing approach to autonomic healing. It starts by identifying the most recently updated microservice. It deploys the previous version of the microservice and routes a portion of the user traffic across the previous version, while continuing to route the remaining user traffic across the current version of the microservice. The embodiment continues to test various past versions until it finds one that meets the performance requirements specified in the performance monitor.

Theoretically, in an application with n microservices with m updates to each service, the search space of all possible deployment combinations is $O(n^m)$. Deploying and testing each version is infeasible and beats the purpose of a fast auto-response tool. Fortunately, the search space can be drastically pruned by taking into account the dependencies across microservices. Thus, an illustrative embodiment of the present invention can leverage version dependencies across services.

The application owner and/or developer can further bound the search by specifying lower bounds known as global restore points. Global restore points typically signify points in the application's history where major updates were made (e.g., schema changes to databases and/or a complete overhaul of application design) beyond which the application cannot (or at least should not) be rolled back. Additionally and/or alternatively, global restore points can be created to signify points in time beyond which the application owner and/or developer is unwilling to rollback the application, for example, because of a potential loss of features. Where one or more global restore points have been specified, an embodiment of the present invention searches from the current version to the most recent global restore point.

Figure 7:
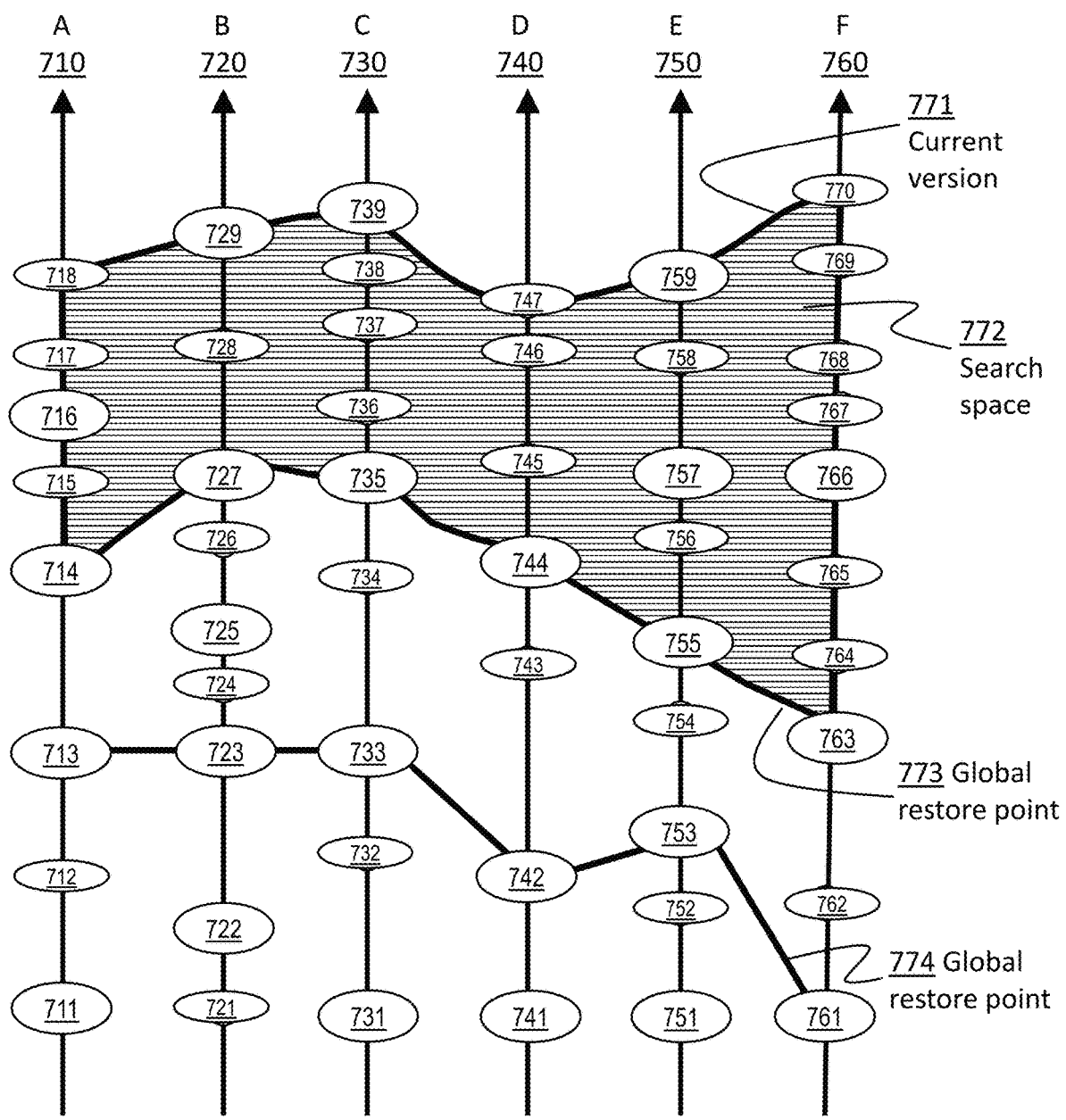
FIG. 7 depicts an exemplary search space according to an embodiment of the present invention.

FIG. 7 depicts revision histories 710-760 corresponding to microservices A-F. As with FIG. 6B, the top of each revision history represents the latest versions, with older versions being shown lower on the revision history. On each revision history, the larger shapes represent major updates, while the smaller shapes represent minor updates. Thus, the combination of microservices designated by line 771 represents the current version: note that the connected shapes are those at the top of each revision history. Lines 773 and 774 represent combination of microservices designated as global restore points. Thus, the search space 772 for an illustrative embodiment of the present invention is between the current version 771 and the most recent global restore point 773.

An embodiment of the present invention may start from the most recent update to a microservice and then proceed sequentially in reverse chronological order. However, when a restore point is available, to speed up the search, some embodiments may perform a binary search between the most recent global restore point 773 and the version of the application corresponding to the latest update 771. In these embodiments, the search algorithm starts by picking a random update in the highlighted search region 772. If this alternate version does not trigger alerts from the performance monitoring tool, the algorithm proceeds to search the second half of the commit history between the alternate version and the latest version. If the alternate version also performs poorly, the algorithm proceeds to search the first half of the commit history between the restore point and the alternate version. Throughout the course of the search, the latest version of the application remains deployed, ensuring that some version of the application is always available to the user until an alternative version with better performance is found.

Figure 8A:
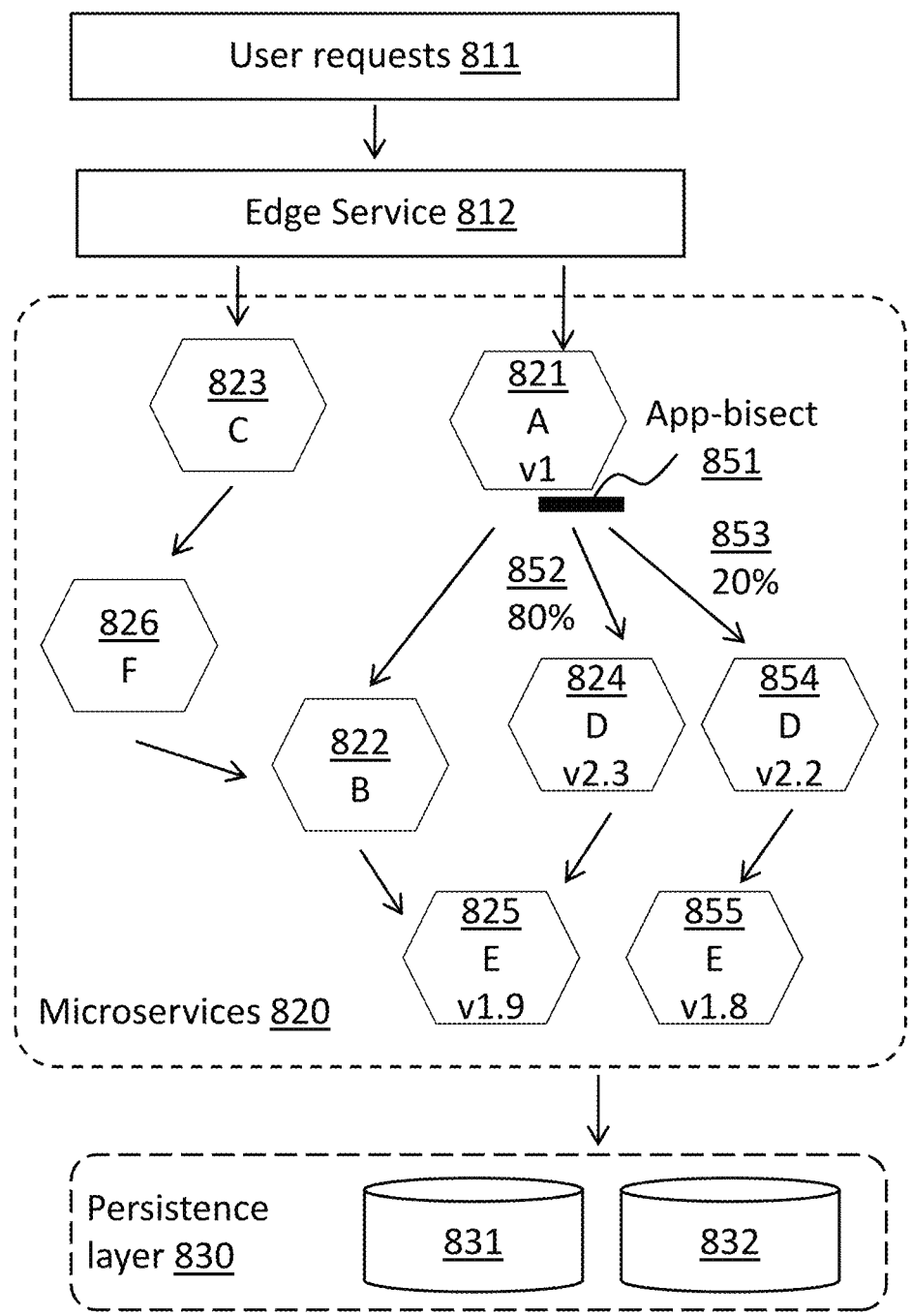
FIG. 8A depicts an exemplary embodiment of the present invention deployed within the application shown in FIG. 5A.
Figure 8B:
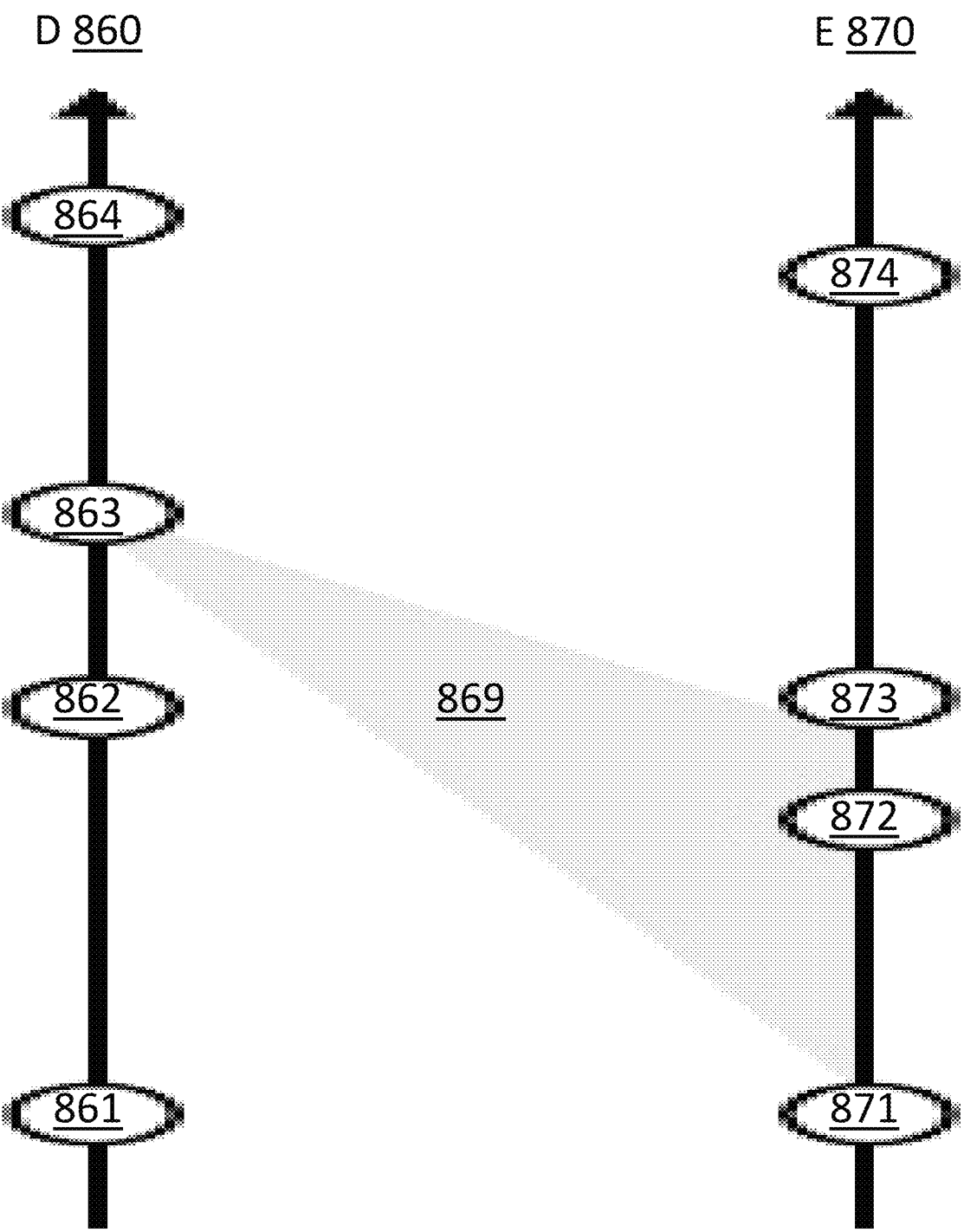
FIG. 8B depicts an exemplary dependency range associated with the embodiment shown in FIG. 8A.

FIG. 8A depicts an exemplary embodiment of the present invention deployed within the application shown in FIG. 5A. FIG. 8B depicts an exemplary dependency range associated with the embodiment shown in FIG. 8A. In FIG. 8B, revision history 860 for microservice D shows the most recent version (shape 864) to be 2.3, with older versions including shape 863 (version 2.2), shape 862 (version 2.1) and shape 861 (version 2.0). Revision history 870 for microservice E shows the most recent version (shape 874) to be 1.9, with older versions including shape 873 (version 1.8), shape 872 (version 1.7), and shape 871 (version 1.6). The shaded portion 869 shows the dependency range for version 2.2 (shape 863) of microservice D (revision history 860) to require that microservice E (revision history 870) have a version less than or equal to 1.8 (shape 873).

FIG. 8A depicts an application similar to that shown in FIG. 5A. Edge service 812 distributes user requests 811 to microservices C 823 and A 821. Microservice C 823 directs its output to microservice F 826, which in turn directs its output to microservice B 822. However, in addition to the current version 2.3 of microservice D 824, a previous version 2.2 of microservice D 854 is also deployed for testing. An illustrative embodiment of the present invention includes an "app-bisect" application 851, which could be implemented in client-side load balancer 555, which is operative to distribute traffic not only between microservice B 822 and current microservice D 824, but also to the prior microservice D 854. In this example, 20% of the traffic 853 normally routed by microservice A 821 to microservice D 824 is instead routed to prior microservice D 854, such that the current microservice D 824 only receives 80% of its usual traffic 852.

Moreover, as discussed above with reference to 869 in FIG. 8B, version 2.2 of microservice D 854 is only compatible with versions of microservice E less than or equal to 1.8. Thus, the previous version 2.2 of microservice D 854 is incompatible with the current version 1.9 of microservice E 825. Accordingly, the previous version 1.8 of microservice E 855 has also been deployed, with all traffic from the previous version of microservice D 854 being routed to the previous version of microservice E 855 while all traffic from the current version of microservice D 824 remains routed to the current version of microservice E 825. Both the current version 825 and the previous version 855 of microservice E directs all output to persistence layer 830 (e.g., scalable data stores 831 and 832). Thus, it is not only an alternate microservice D 854 that has been deployed, but an entire microservice chain including microservice D 854 and microservice E 855.

Thus, the alternate version of the microservice and its corresponding dependencies are deployed. As described earlier with reference to FIG. 8A, using canary testing techniques, a portion of incoming traffic is redirected to the alternate version of the application deployment and its performance is monitored over a small period of time (e.g., 1-2 minutes). Accordingly, an illustrative embodiment evaluates a downgraded version by deploying an older service chain, routing a portion of user traffic through the older service chain using version-aware routing, and monitoring application metrics for error symptoms.

One possible issue regards maintaining consistency of the state stored in the data stores as essentially different versions of the same microservices (e.g., 825, 855) are accessing the same data store (e.g., 831, 832). As discussed above, embodiments of the present invention employ an approach to searching for a substitute version which leverages the canary testing practice used by modern web applications. Canary testing is typically conducted directly in production deployments. Hence the microservices are engineered from the very beginning to handle scenarios where multiple versions can co-exist, accessing the same data store backends. Embodiments of the present invention piggyback on this capability to provide a gradual feature downgrade in certain parts of the application. However, some embodiments may require the search to be limited to microservice versions that do not involve changes to the data model in the data store. This can be addressed through the global restore points discussed above with reference to FIG. 7.

Thus, at any given point in time during the search, there may be two or more versions of multiple microservices in the application. Requests have to flow through a specific chain of microservices, where the dependencies are satisfied. In order to route requests through a specific chain of microservices without requiring modifications to the application, an illustrative embodiment of the present invention leverages the software defined networking (SDN) substrate in public cloud data center networks to achieve version-aware routing. The combination of host IP address and the edge-switch port number can be used to uniquely identify a particular microservice and its respective version. The illustrative embodiment uses this information to setup flow forwarding rules that route requests through a particular chain of microservices. For example, the illustrative embodiment can setup routes according to the combination of versions being tested before routing traffic to the service chain.

During the search process, two chains of microservices being tested may have one or more microservices in common. While it may be operationally efficient to share such instances of such microservices, version-aware routing becomes hard. Specifically, if two microservice call chains diverge from a given microservice, an embodiment of the present invention may be unable to decide where to route egress requests without application layer support for intelligent routing. On the other hand, when two microservice call chains converge to the same final set of microservices, an embodiment of the present invention can reuse those microservice instances while still being able to route requests in a version-aware manner.

A version of the application should preferably remain available while an embodiment of the present invention deploys, tests and destroys previous versions of the candidate microservices in the application. An embodiment could let the original (latest) version of the application remain operational for this purpose. Alternatively, a version corresponding to the restore point version could be deployed at the risk of unnecessarily losing features and bug fixes that are unrelated to the component performing poorly.

The search process can take a very long time, especially when a restore point is not provided. An embodiment of the present invention may parallelize the search by testing multiple deployments simultaneously. This approach can be thought of as an n-ary version of the typically binary style canary testing. This approach advantageously allows triage to be completed quickly, thereby reducing the impact on application availability.

Additionally and/or alternatively, an embodiment of the present invention may include a downgrader that upon receiving one or more fault signals as determined by variation from one or more performance metrics performs the following steps: determining all possible compatible and older versions of micro-service application combinations in production alongside a current deployment by doing a dependency analysis (e.g. with a dependency graph); determining a global restore point for the current deployment, the global restore point being the set of microservice applications in a prior deployment where major updates were made, e.g. schema changes; selecting a set of selected micro-service applications being the micro-service applications that have dependencies to the micro-service application generating the fault signal and were deployed after the global restore point; and downgrading by deploying the set of selected micro-service applications deployed at a prior time in production alongside the current application deployment. Downgrading may further comprise moving at least a portion of request traffic from one or more of the micro-service applications in the current deployment to one or more of the micro-service applications in the set of selected micro-service applications deployed at a prior time.

The set of selected micro-service applications may be deployed by priority from current version to the most recent global restore point. The set of selected micro-service applications deployed may be selected by canary testing. The set of selected micro-service applications may be selected for deployment because of not exhibiting performance regressions.

In some embodiments, the set of selected micro-service applications selected for deployment are not related to infrastructure failures. The set of selected micro-service applications may be the most recent and compatible version. The micro-service application in the set of selected micro-service applications may be deployed only if they are compatible. The set of selected micro-service applications may be deployed by transferring all traffic at once. The set of selected micro-service applications may be deployed by transferring traffic gradually over time.

In some embodiments of the system, there are multiple final subsets of microservices evaluated simultaneously, by being deployed in the same infrastructure, each different and each serving a portion of user traffic. Additionally and/or alternatively, there are multiple sets of deployed selected micro-service applications, each different and each to a different user.

One or more embodiments address version-aware routing across different chains of microservices using SDN. In some embodiments of the system, the system interacts with the underlying SDN to set up packet routing through the final subset of microservices such that the traffic flows only across each of the final subsets of microservices individually, and does not spill into another final subset of microservices that may not be able to handle the request.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 1, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 1) running a server program. It will be understood that such a physical server may or may not include a display and keyboard.

One or more embodiments are particularly significant in the context of a cloud or virtual machine environment, although this is exemplary and non-limiting. Reference is made back to FIGS. 1-3 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks making up the exemplary system described above. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface to implement user interface aspects is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. References herein to "the invention" or the like are intended to be representative of one or more embodiments of the invention and are not intended to imply that all embodiments necessarily include every feature, step, or element described therein.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for autonomous healing of an application comprising a plurality of microservices, comprising the steps of:
   detecting a performance degradation of at least a portion of the application, wherein the application is deployed in a production environment, and wherein the application deployed in the production environment comprises respective current versions of the plurality of microservices;
   responsive to detecting the performance degradation in the production environment, autonomically downgrading at least one of the plurality of microservices within the application, the downgrading comprising:
      deploying a prior version of the at least one of the plurality of microservices in the production environment; and
      routing at least a portion of traffic to the prior version instead of a current version of the at least one of the plurality of microservices in the production environment;
   determining whether the prior version remedies the performance degradation;
   if the prior version does not remedy the performance degradation:
      deploying a different version of the at least one of the plurality of microservices, the different version being neither the prior version nor the current version of the at least one of the plurality of microservices; and
      routing at least a portion of traffic to the different version instead of the prior version of the at least one of the plurality of microservices, wherein the prior version and the different version are determined by performing a binary search within a region bounded by the current version and a global restore point.

2. The method of claim 1, wherein, within the downgrading step:
   the deploying comprises deploying a different version of the at least one of the plurality of microservices alongside the prior version and the current version; and
   the routing comprises routing the first portion of the traffic to the prior version, the second portion of the traffic to the current version, and a third portion of the traffic to the different version.

3. The method of claim 1, wherein the routing comprises version-aware routing of the first and second portions of the traffic through respective first and second chains of microservices.

4. The method of claim 3, wherein the version-aware routing is performed without modifying the application.

5. The method of claim 3, wherein the version-aware routing comprises using a software defined network (SDN) substrate to uniquely identify both a particular one of the plurality of microservices and a specific version of the particular one of the plurality of microservices.

6. The method of claim 3, wherein the version-aware routing comprises using a combination of host address and port number to uniquely identify both a particular one of the plurality of microservices and a specific version of the particular one of the plurality of microservices.

7. The method of claim 6, wherein the host address comprises a host Internet Protocol (IP) address and the port number comprises an edge-switch port number.

8. The method of claim 1, wherein downgrading at least one of the plurality of microservices within the application comprises downgrading at least two microservices comprising:
   a first one of the plurality of the microservices; and
   at least a second one of the plurality of the microservices;
   wherein the at least second one of the plurality of microservices depends from the first one of the plurality of microservices.

9. The method of claim 8, wherein downgrading the at least two microservices comprises deploying a prior version of the second one of the plurality of microservices which is compatible with the prior version of the first one of the plurality of microservices.

10. The method of claim 9, wherein downgrading the at least two microservices comprises deploying a latest version of the second one of the plurality of microservices which is compatible with the prior version of the first one of the plurality of microservices.

11. The method of claim 1, wherein the at least downgrading at least one of the plurality of microservices within the application comprises downgrading at least two microservices comprising:
   a given one of the plurality of the microservices; and
   each one of the plurality of the microservices which depends from the given one of the plurality of microservices.

12. The method of claim 1, wherein the prior version and the different version are both within the region bounded by the current version and the global restore point.

13. The method of claim 12, wherein the prior version and the different version are determined by proceeding sequentially from the current version in reverse chronological order.

14. The method of claim 1,
   further comprising, responsive to detecting the performance degradation, determining whether the performance degradation is caused by infrastructure rather than the application; and
   wherein the downgrading is only performed when the performance degradation is not caused by infrastructure rather than application.

15. The method of claim 1,
   further comprising, responsive to detecting the performance degradation, determining whether the performance degradation is transient; and
   wherein the downgrading is only performed when the performance degradation is not transient.

16. The method of claim 1, wherein downgrading at least one of the plurality of microservices restores a previously-deployed configuration of the application comprising the prior version of the at least one of the plurality of microservices.

17. The method of claim 16, wherein the previously-deployed configuration of the application further comprises the current version of at least another one of the plurality of microservices.

18. An apparatus comprising:
   a memory; and
   at least one processor coupled with the memory and operative:
      to detect a performance degradation of at least a portion of an application, wherein the application is deployed in a production environment, and wherein the application deployed in the production environment comprises respective current versions of a plurality of microservices;

responsive to detecting the performance degradation, to autonomically downgrade at least one of the plurality of microservices within the application, the downgrading comprising:
  deploying a prior version of the at least one of the plurality of microservices in the production environment; and
  routing at least a portion of traffic to the prior version instead of a current version of the at least one of the plurality of microservices in the production environment;
to determine whether the prior version remedies the performance degradation;
if the prior version does not remedy the performance degradation:
  to deploy a different version of the at least one of the plurality of microservices, the different version being neither the prior version nor the current version of the at least one of the plurality of microservices; and
  to route at least a portion of traffic to the different version instead of the prior version of the at least one of the plurality of microservices, wherein the prior version and the different version are determined by performing a binary search within the region bounded by the current version and a global restore point.

19. A computer program product comprising a non-transitory machine-readable storage medium having machine-readable program code embodied therewith, said machine-readable program code comprising:
machine-readable program code configured:
  to detect a performance degradation of at least a portion of an application, wherein the application is deployed in a production environment, and wherein the application deployed in the production environment comprises respective current versions of a plurality of microservices;
  responsive to detecting the performance degradation, to autonomically downgrade at least one of the plurality of microservices within the application, the downgrading comprising:
    deploying a prior version of the at least one of the plurality of microservices in the production environment; and
    routing at least a portion of traffic to the prior version instead of a current version of the at least one of the plurality of microservices in the production environment;
determining whether the prior version remedies the performance degradation;
if the prior version does not remedy the performance degradation:
  deploying a different version of the at least one of the plurality of microservices, the different version being neither the prior version nor the current version of the at least one of the plurality of microservices; and
  routing at least a portion of traffic to the different version instead of the prior version of the at least one of the plurality of microservices, wherein the prior version and the different version are determined by performing a binary search within the region bounded by the current version and a global restore point.

* * * * *